United States Patent [19]

Newhard

[11] 4,456,420
[45] Jun. 26, 1984

[54] CAR CARRIER HAVING A SLIDING AND TILTING PLATFORM

[76] Inventor: Robert H. Newhard, 1230 16th St., North, St. Petersburg, Fla. 33705

[21] Appl. No.: 305,088

[22] Filed: Sep. 24, 1981

[51] Int. Cl.³ .............................. B60P 1/16; B60P 1/78; B60P 3/07
[52] U.S. Cl. .................................. 414/478; 414/477; 293/118; 293/137
[58] Field of Search ................................ 414/473–479, 414/469, 471, 480; 293/102, 118, 135–137; 410/4.6, 28.1, 29.1; 298/17 R

[56] References Cited

U.S. PATENT DOCUMENTS

| | | | |
|---|---|---|---|
| 1,840,705 | 1/1932 | Eichelberger | 410/28.1 |
| 2,621,814 | 12/1952 | Lisota | 414/477 |
| 2,799,531 | 7/1957 | Vine | 298/17 R |
| 3,159,294 | 12/1964 | Forsythe | 414/478 |
| 3,430,792 | 3/1969 | Grove et al. | 414/477 |
| 3,450,282 | 6/1969 | Ezolt | 414/477 |
| 3,485,400 | 12/1969 | Dewthers | 414/477 |
| 3,638,817 | 2/1972 | Corompt | 414/477 |
| 3,690,490 | 9/1972 | Hall | 414/477 |
| 3,756,643 | 9/1973 | Weed | 293/137 |
| 4,015,879 | 4/1977 | Shonkwiler | 414/477 |
| 4,139,236 | 2/1979 | Hill et al. | 414/477 |
| 4,175,904 | 11/1979 | Airaksinen | 414/469 |
| 4,239,275 | 12/1980 | Horneys et al. | 414/478 |

FOREIGN PATENT DOCUMENTS

839744  7/1981  U.S.S.R. .............................. 414/469

Primary Examiner—Bruce H. Stoner, Jr.
Assistant Examiner—James E. Barlow
Attorney, Agent, or Firm—Duckworth, Allen, Dyer & Pettis

[57] ABSTRACT

An improved car carrier of the type including a service vehicle having front and rear wheels, a frame, axle springs, and a displaceable platform is disclosed having structure for pivoting and sliding the displaceable platform along a specified path, and a support foot assembly capable of supporting the load on the displaceable platform during a predetermined interval, when the displaceable platform is displaced from a transport position to a load position. The displaceable platform is itself of angled configuration for ramping of a first car to be carried and for aft attachment and clearance of a second car to be towed.

12 Claims, 7 Drawing Figures

CAR CARRIER HAVING A SLIDING AND TILTING PLATFORM

BACKGROUND OF THE INVENTION

1. Field of the Invention

There are currently two types of service vehicles being manufactured for the purpose of transporting disabled automobiles or other vehicles not suitable for transportation on the highways. These service vehicles are the tow-truck, and the vehicle carrier. This invention relates to vehicle carriers in general, commonly known and herein referred to as car carriers, and more particularly to a two car carrier capable of loading a first car onto a platform that also provides apparatus for towing a second car behind.

2. Description of the Prior Art

Car carriers of the prior art accomplish loading by various means. One means is to slide a platform back within guides of a subframe pivotally coupled to the rear of the service vehicle frame and to tilt the subframe and connecting platorm into engagement with the ground to form a loading ramp up which cars may be pulled or driven. Support feet rigidly attached to the tilted subframe contact the ground and provide intermediate platform support. Car carriers of this type are characterized by a number of objectional features. Among those are: the support feet are not well adapted to uneven ground contact relative to ground contacted by the rearmost edge of the tilted platform or by the wheels of the service vehicle; the susceptibility of damage to the service vehicle by operator error whereas premature tilting of the subframe will disengage the support feet allowing an extended platform to cantilever from the frame of the service vehicle causing damage thereto; and platform positioning being a two step procedure whereby first the platform is tilted and second the platform extended.

Another means for loading is disclosed in the Grove patent, U.S. Pat. No. 3,430,792, wherein a platform slides back and pivots on a fixed pivot at the rear of the service vehicle frame where also one end of an apparatus for tilting the platform is pivotally coupled that includes a pair of hydraulic jack support feet having first ends in sliding engagement with the platform and second ends that contact the ground. Car carriers of this type cannot damage the frame of the service vehicle yet are also characterized by a number of objectional features. Among those are: the two hydraulic jack support feet of the tilt apparatus act as a unit and are therefore not well adapted to contacting substantially uneven ground relative to each other; the rear wheels of the service vehicle can be uplifted if the load's center of gravity is towards the rear of an extended platform as it is to be tilted; and the platform positioning is a three step procedure whereby first the tilt apparatus is lowered into ground contact, second the platform is extended, and third the platform tilted.

Still another means for loading is disclosed in the Ezolt patent, U.S. Pat. No. 3,450,282, wherein a platform is simultaneously slid back and tilted on a fixed rear pivot by extendable couplers having first ends pivotally coupled to the frame of the service vehicle and second ends pivotally coupled to the forward headboard end of the platform. Car carriers of this type are able to position the platform in a one step procedure yet are also characterized by a number of objectional features. Among those are: the platform positioning path is not specified thus requiring path compensation by varying the length of the couplers which are of complex construction; intermediate platform support feet are not provided thus requiring heavier platform construction that reduces payload while also subjecting the rear of the service vehicle frame to high stresses and damage thereto when an extended platform cantilevers from the frame during positioning; and a rear bumper is not provided as required by regulations governing highway vehicles.

A further means cited for loading is disclosed in the Forsythe patent, U.S. Pat. No. 3,159,294, wherein couplers of fixed length simultaneously tilt and slide a platform back within guides of a subframe pivotally coupled to the rear of the service vehicle frame. Support feet rigidly attached to the tilted subframe contact the ground and provide intermediate platform support. Car carriers of this type are able to position the platform in a one step procedure, provide support feet, include a bumper, and do not require couplers of complex construction yet are also characterized by a number of objectionable features. Among those are: a subframe is required; the support feet will only contact the ground when the platform is in load position and serve no purpose during any interval of platform positioning thus requiring heavier platform construction that reduces payload while also subjecting the rear of the service vehicle frame to high stresses and damage when an extended platform cantilevers from the frame during positioning; the support feet are not well adapted to contacting uneven ground relative to ground contacted by the rearmost edge of the tilted platform or by the wheels of the service vehicle; and the platform positioning path is not specified nor is it compensated, thus allowing the rearmost edge of the platform to contact the ground prematurely which can prevent the platform from obtaining load position and advantages thereof, or cause the platform to dig in or scrape along the ground prior to obtaining the load position.

Still further objectional characteristics of the prior art include the relatively steep loading angle afforded by the platform in load position. Reducing the loading angle by only a few degrees significantly improves the ramping of cars onto the platform. However, platforms of the prior art are of a single surface plane, that is, a flatbed; thus only by lengthening the platform can the loading angle be improved as the rear wheels of the service vehicle prevent the forward headboard end of the platform from being lowered further. Also, car carriers that include a second car tow apparatus must provide a reasonable distance between the rear of the platform and the towed car to allow clearance for turning corners. However, this reasonable distance places the towed car a further cantilever distance from the rear wheels of the service vehicle substantially increasing the load on same thus decreasing car carrier payload. Additionally, the platform decks of the prior art typically consist of plates welded to crossmembers. These plates are difficult to handle during fabrication and require considerable welding to construct a platform, with speciality welding a necessity when lightweight materials are used. Furthermore, the majority of prior art car carriers require considerable reinforcement of the service vehicle frame to offset the objectional design characteristics previously mentioned and allow their safe operation. Other frame alterations often include clearing or relocating existing frame crossmembers to eliminate interference with elements of the platform positioning mechanism, and lengthening of the frame and driveshaft to increase the wheel base of the service vehicle thereby affording better front and rear wheel weight distribution to increase payload.

SUMMARY OF THE INVENTION

It is an object of the present invention to provide an improved means for pivoting and sliding a displaceable platform into a load position that will engage the platform rear edge with a ground surface to form a ramp up which cars may be pulled or driven. The improved means overcomes the disadvantages of the prior art by providing couplers of fixed length having first ends pivotally coupled to the frame of the service vehicle and second ends pivotally coupled to the forward headbard end of the platform. At a point intermediate of said first and second ends, the couplers are pivotally coupled to and driven by the ram end of a hydraulic drive cylinder which has a body end pivotally coupled to the frame of the service vehicle. Rollers connected to the rear of the service vehicle frame engage cam plates fixed to the displaceable platform thus providing rear platform support as well as specifying a path for the platform to follow during platform displacement. The profile of the platform cam plates will allow the rear edge of the platform to engage ground a limited distance below that experienced by the wheels of the service vehicle, and an unlimited distance above as the cam plates are free to disengage the rollers when the platform becomes rear supported in load position by the ground that has been contacted at the platform rear edge. Support feet, capable of transferring the major portion of the displaceable platform load from the cam plate rollers to the ground during an interval substantially before and after the platform load position, are pivotally coupled to a shaft fixed to the service vehicle frame. An interaction between the platform and support feet during the initial and final stages of platform positioning cause the support feet to lower into or raise from ground engagement, and other than this period of interaction the support feet are independent of platform position and each other.

Therefore, the improved car carrier of this type according to the present invention is characterized by the fact that platform positioning is a one step procedure whereby driven couplers simultaneously tilt and slide a displaceable platform along a specified path into engagement with a support surface as support feet also engage a support surface and provide intermediate platform support during a substantial interval of platform positioning. The platform is well adapted to contacting uneven ground relative to ground cotacted by the wheels of the service vehicle, and the support feet are well adapted to contacting uneven ground relative to the platform as well as the wheels of the service vehicle. Also, each individual support foot is well adapted to contacting uneven ground relative to each other. The frame of the service vehicle encounters no high stresses during platform displacement and thus requires no reinforcement, nor do frame crossmembers require alteration as all elements of the platform positioning mechanism locate without interference. Furthermore, the frame of the service vehicle is not subject to damage by operator error as the platform is easily and substantially fail-safe positioned by a single control.

Another object of the present invention is to reduce the loading angle experienced by cars ramped on and off of the platform in load position, without lowering the headboard end of the platform further or increasing the platform length. The improved platform therefore graduates the loading angle by proportioning multiple planes of platform surface in such a manner that the improved platform configuration provides a car with less change in vertical dimension per unit of horizontal distance traveled as it is ramped on and off the platform as compared to the prior art flatbed platforms of single surface plane. In addition, the graduated platform in transport position disposes the platform rear edge at an elevation that allows direct coupling of a second car tow bar to same, while also allowing the towed car to pass under and clear the platform as the car carrier turns corners. Thus the towed second car, with one end lifted by the tow bar, will be a lesser cantilever distance from the rear wheels of the service vehicle substantially decreasing load on same thereby increasing the car carrier payload over that of the prior art.

Still another object of the present invention is to provide an easily fabricated and lightweight car carrier. The platform comprises a plurality of interlocking, internally ribbed, box extrusions of lightweight material which slide together and fasten to the main platform support beams. Also, the platform positioning mechanism is aided by a gravity loaded return spring arrangement, an integral part of the support feet, thereby greatly reducing the size and weight of the positioning components. Therefore, the improved car carrier is of lightweight construction and easily fabricated with a minimum of welding thereby decreasing cost while increasing payload to the extent the frame and driveshaft of the service vehicle need not be lengthened as required of the prior art.

A further object of the present invention is to provide a rear bumper for the service vehicle at a prescribed location relative to the platform rear edge and ground surface as stipulated by regulations governing highway vehicles. Therefore, the improved car carrier includes a bumper at the prescribed location pivotally coupled to the platform and frame of the service vehicle in a manner whereby the bumper will swing clear of the platform as it is displaced. In addition, elements of the bumper arrangement include a return spring that is partially loaded by gravity means which will also assist the platform positioning mechanism displace the platform from the load to transport position.

Other objects and advantages of the present invention will become apparent from the following detailed description of the preferred embodiment when taken in conjunction with the accompanying drawings.

BRIEF DESCRIPTION OF THE DRAWINGS

Referring now to the drawings which illustrate a preferred embodiment of the invention.

Similar reference characters refer to similar parts throughout the several views of the drawings.

DETAILED DESCRIPTION OF THE PREFERRED EMBODIMENT

Figure 1:
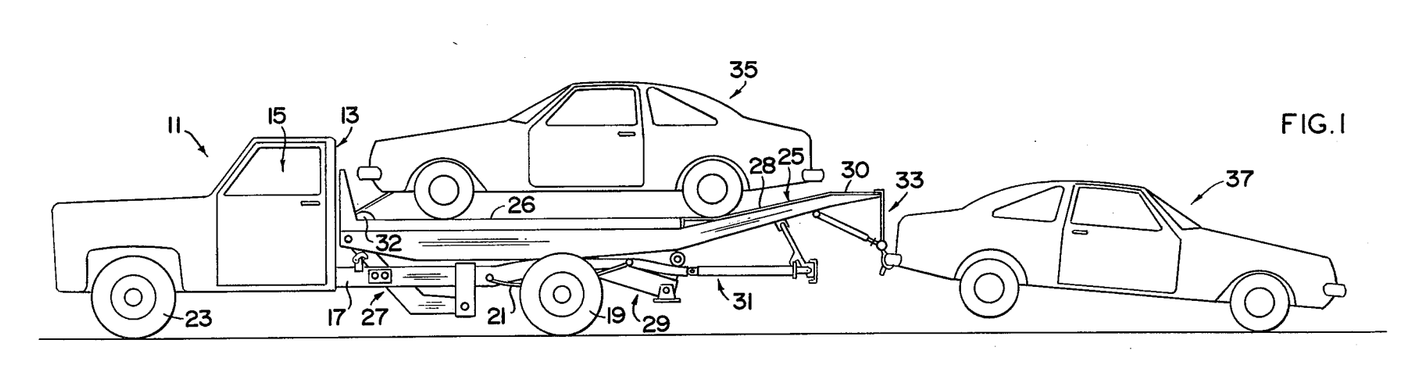
FIG. 1 is a side elevation view of the improved car carrier in the transport position showing a first car being carried on the platform and a second car being towed.

Illustrated in FIG. 1 is the operational configuration of the improved car carrier generally indicated at 11 of the present invention in the transport position. The car carrier 11 includes a service vehicle 13 having a cab 15 and a service vehicle frame 17 of conventional construction. The service vehicle 13 also includes rear wheels 19 which are coupled to the frame 17 by means of axle springs 21. Front wheels 23 are usually disposed under the cab 15. The improved car carrier 11 illustrated in FIG. 1 also includes a displaceable platform assembly generally indicated at 25, a platform positioning assembly 27, a pair of support foot assemblies 29, a bumper assembly 31, and a tow bar assembly 33. These assemblies are discussed in greater detail below.

In the illustration of FIG. 1 there is shown a carried car 35 supported by the platform 25 and a towed car 37 coupled to the platform 25 by means of a tow bar 33. In this transport position the support feed 29 are raised and the major portion of all loads are taken through the axle springs 21 and into the rear wheels 19 with the remainder load portion taken through the frame 17 and into the front wheels 23.

Figure 2:
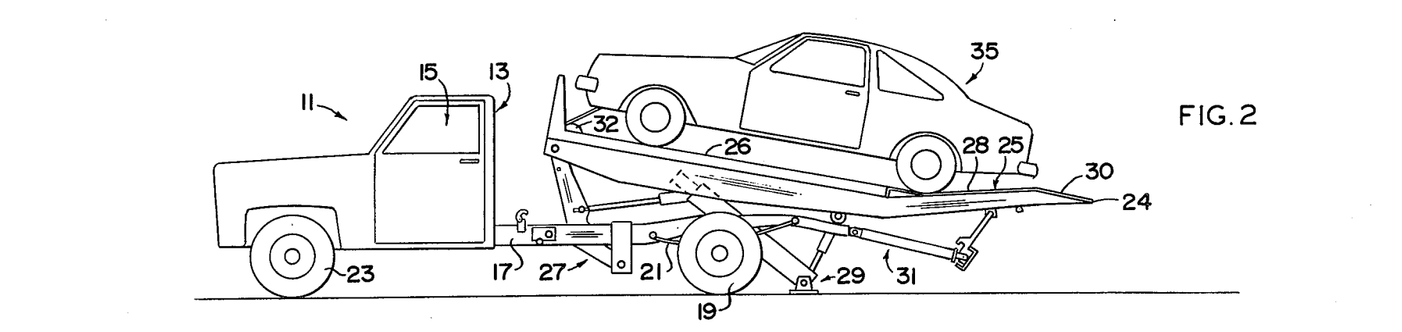
FIG. 2 is a side elevation view of the improved car carrier at an intermediate position with the support feet lowered.
Figure 3:
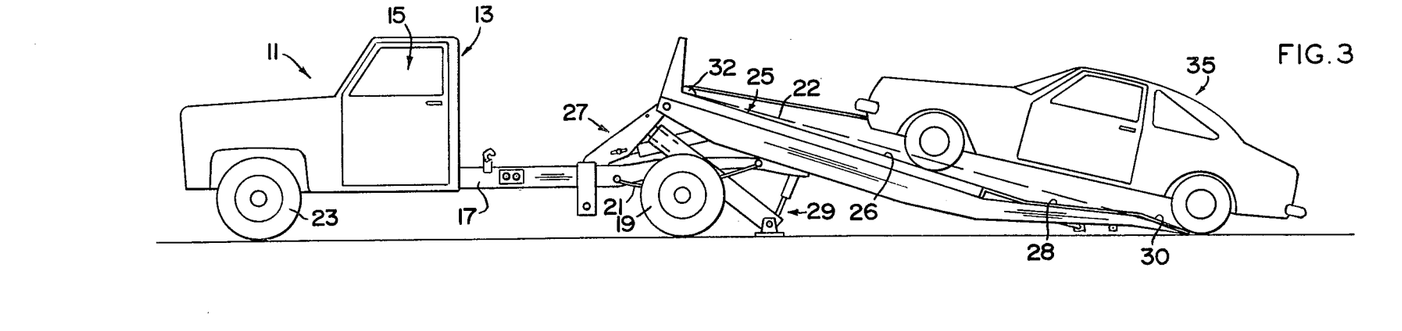
FIG. 3 is a side elevation view of the improved car carrier in the load position, the surface of a prior art flatbed platform is indicated by dotted line.

Illustrated in FIG. 2 is the car carrier 11 at an intermediate position which may be intermediate of the loading or unloading process. As illustrated in FIG. 2, the support feet 29 are lowered and firmly planted on a support surface and will thus remain as the positioning assembly 27 proceeds to displace the platform 25 into the load position as is illustrated in FIG. 3. As will become apparent from the detailed description of the support feet 29 below, the major portion of the weight of the carried car 35 and displaceable platform assembly 25 is supported by the support feet 29 when the platform 25 is in the position illustrated in FIG. 2. The support feet 29 will continue to support said weight until the platform rear edge 24 contacts a ground surface, as the positioning assembly 27 displaces the platform 25 from the intermediate position illustrated in FIG. 2 to the load position illustrated in FIG. 3.

Illustrated in FIG. 3 is the initial loading or final unloading step in the method to be practiced by the car carrier 11 of the present invention. As is illustrated in FIG. 3, the platform assembly 25 is of an angled configuration unlike that of a prior art flatbed platform 22 indicated by dotted line. The angled configuration of the platform 25 serves a twofold purpose. A first purpose is to reduce the loading angle experienced by a car 35 being ramped on and off the platform 25, and a second purpose is to dispose the platform rear edge 24 at an elevation in the transport position that will allow direct coupling of a second car 37 by tow bar 33 to same. The angled configuration of the platform 25 serves to graduate the loading angle by proportioning multiple planes of platform surface in a manner that provides a car 35 with less change in vertical dimension per unit of horizontal distance traveled on and off the platform 25 as compared to the prior art flatbed platform 22.

As is illustrated in FIG. 3, a car 35 to be loaded or unloaded is shown in the position whereby the maximum loading angle is experienced, and which would further increase to disadvantage if the forward wheels of the car 35 were to rest on a prior art flatbed platform 22 indicated by dotted line. Specifically, the platform 25 of the preferred embodiment consists of, but is not limited to, three surface planes. A first surface plane 26 extends from the headboard end of the platform 25 to a first bendline which begins a second surface plane 28 at an angle to the first surface plane 26 which thus defines the minimum loading angle, near 12 degrees, that can be experienced by a car 35 being loaded or unloaded. The second surface plane 28 continues from the first bend line rearward to a second bendline which thus begins a third surface plane 30 at an angle to the second surface plane 28 which will orient the third surface plane 30 substantially parallel to the first surface plane 26. Proportioning the lengths of the surface planes, and their angles to each other, will reduce the maximum loading angle as compared to a prior art flatbed platform 22 of same length. In practice the maximum loading angle experienced by a car varies, and will increase as the wheelbase of the car 35 increases, but will always be less than that afforded by the prior art so long as the length of the platform 25 exceeds the wheel base of the car 35. However, the maximum loading angle can never be less than the minimum loading angle, near 12 degrees, as defined by the angle of the second platform surface plane 28 to the first platform surface plane 26. The angled configuration of the platform 25 also serves to dispose the rear edge 24 of the platform 25 at an elevation in the transport position that will allow direct coupling of a second car tow bar 33 to same, enabling the towed car 37 to pass under and clear the platform 25 as the car carrier 11 turns corners. As compared to the prior art, the towed car 37 is therefore a lesser cantilever distance from the rear wheels 19 of the service vehicle 13 thereby substantially decreasing load on said rear wheels 19 while increasing car carrier 11 payload.

A winch 32 is provided at the front of the platform 25 to assist in loading and securing the carried car 35. When the car carrier 11 is in the position illustrated in FIG. 3, the bumper assembly 31 is fully extended and clear of the platform. The two bar assembly 33 has been manually removed. The operation and details of the different assemblies illustrated in FIGS. 1 through 3 are discussed in greater detail below.

Figure 4:
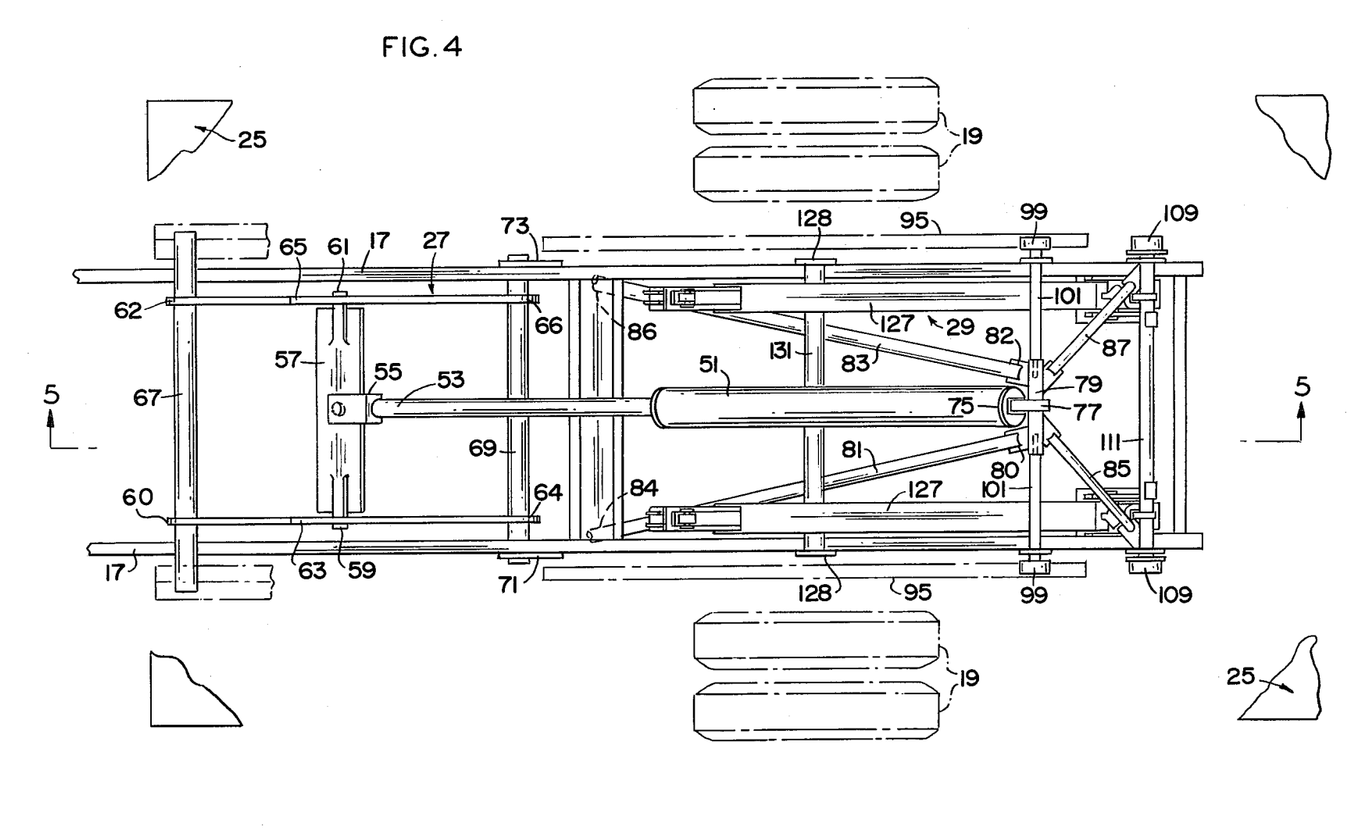
FIG. 4 is a cut-away top plan view of the platform positioning assembly and the support foot assembly of the improved car carrier.

Illustrated in FIG. 4 is a cut-away top plan view of the platform positioning assembly 27 and a portion of the support foot assembly 29. The platform positioning assembly 27 includes a double action hydraulic cylinder 51 having a ram end 53 attached to a clevis 55. The clevis 55 is pivotally coupled to a rotatable cross bar 57 having rounded ends 59 and 61. The rounded ends 59 and 61 of the cross bar 57 are pivotally coupled to a pair of couplers 63 and 65 at a position intermediate of coupler first ends 60 and 62 and second ends 64 and 66. The couplers 63 and 65 are rigidly attached to first ends 60 and 62 to an upper shaft 67 and rigidly attached at second ends 64 and 66 to a lower shaft 69. The upper shaft 67 is pivotally coupled to the displaceable platform assembly 25 and the lower shaft 69 is pivotally coupled to a pair of brackets 71 and 73 which are rigidly attached to the frame 17. Hydraulic cylinder 51 also includes a body end 75 attached to a clevis lug 77. The clevis lug 77 is pivotally coupled to a pin 79 which is located by stabilizer bars 78 rigidly attached to a primary roller shaft 101 that is discussed in greater detail below. Braces 81 and 83 are major load equalizing braces for the hydraulic cylinder 51, and are rigidly attached at first upper ends 80 and 82 to pin 79 adjacent to clevis lug 77 and are rigidly attached at second lower ends 84 and 86 to lower shaft 69 adjacent to brackets 71 and 73. Braces 85 and 87 are minor load equalizing braces for the horizontal force component felt by the secondary rollers 109 which are discussed in greater detail below. Braces 81, 83, 85 and 87 all act to balance out the majority of high loads experienced during displaceable platform 25 positioning thereby relieving the service vehicle frame 17 of said positioning stresses.

Figure 5:
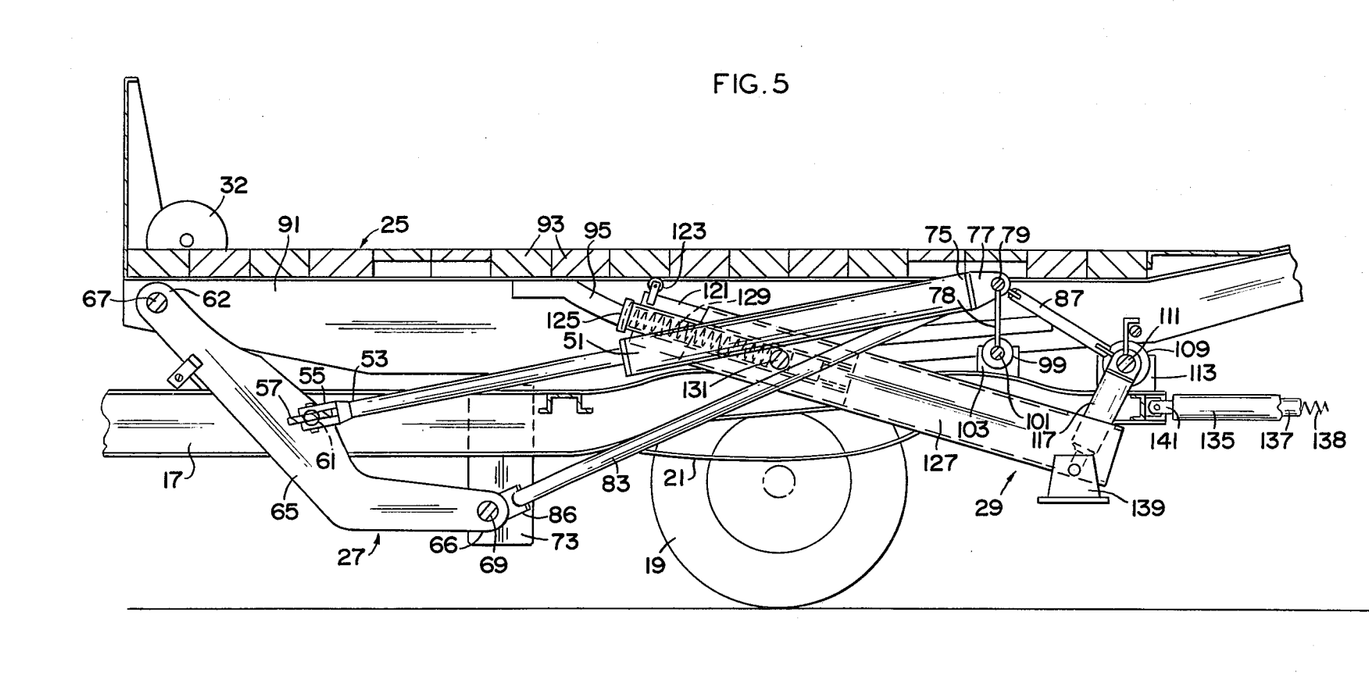
FIG. 5 is a sectional side elevation view taken at 5—5 of FIG. 4 showing the platform positioning assembly and the support foot assembly with the improved car carrier in the transport position.
Figures 6, 7:
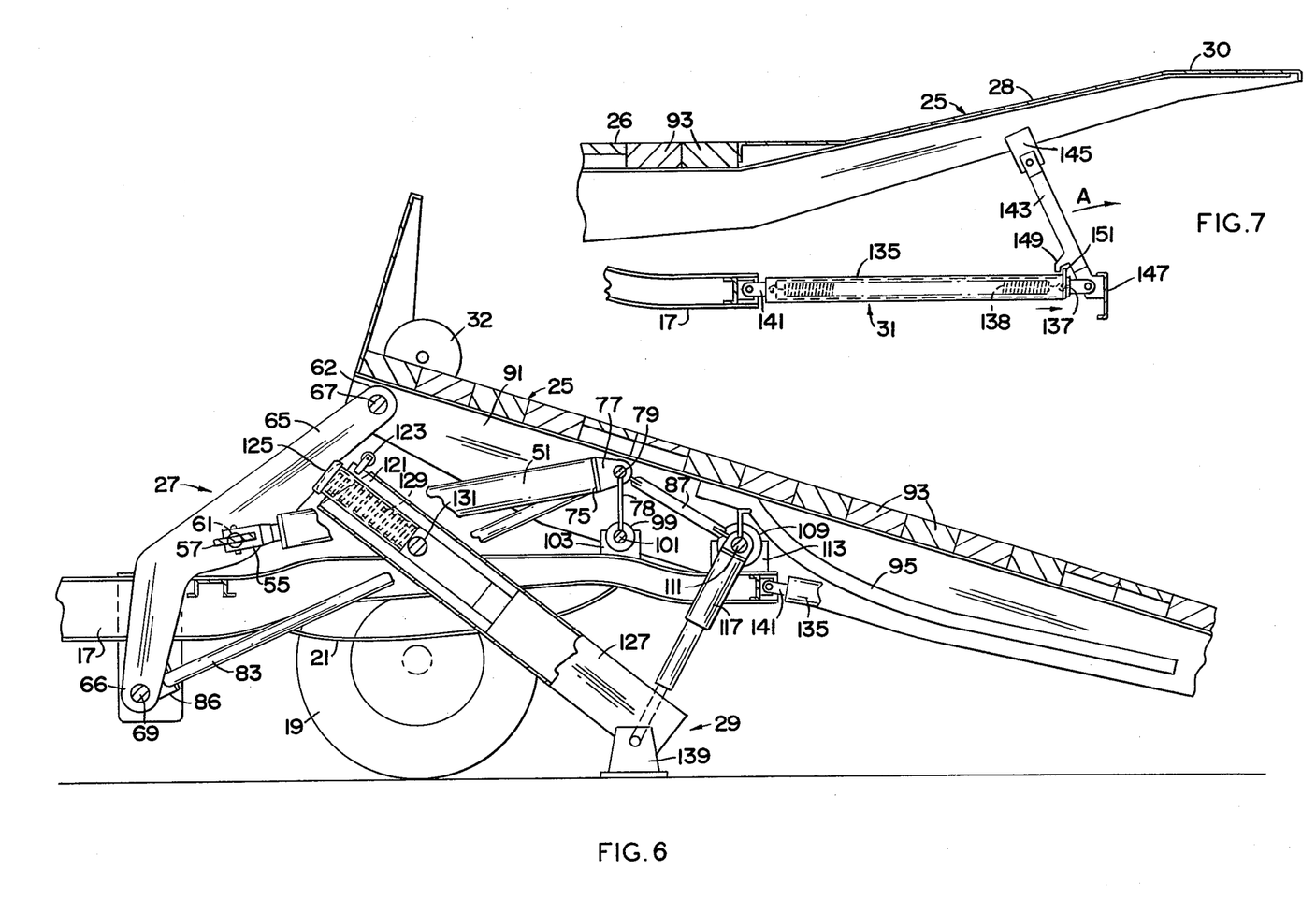
FIG. 6 is a sectional side elevation view of the platform positioning assembly and the support foot assembly with the improved car carrier in the load position.
FIG. 7 is a sectional side elevation view of the bumper assembly with the improved car carrier in the transport position.

It should be noted that the location of hydraulic drive cylinder 51 need not be limited to the position illustrated in FIGS. 4, 5, and 7. The cylinder 51 may be at any orientation pivotally coupled to any elements of the car carrier 11 and accordingly braced so long as the platform 25 can be displaced from a transport position illustrated in FIG. 1, to a load position illustrated in FIG. 3. However, the arrangement of the platform positioning assembly 27 as illustrated in FIGS. 4, 5, and 6 is such that during platform 25 displacement the mechanical moment art of the hydraulic drive cylinder 51, in relation to couplers 63 and 65 about shaft 69, steadily improves to offset steadily increasing loads experienced by the positioning assembly 27 as the platform 25 is displaced from the transport position illustrated in FIGS. 1 and 5 to an intermediate position just prior to the load position illustrated in FIGS. 3 and 6.

FIG. 5 is a sectional side elevation view taken at 5—5 of FIG. 4. As illustrated in FIG. 5, the platform assembly 25 comprises a pair of platform main support beams 91 which straddle an existing unaltered service vehicle frame 17. A plurality of interlocking, internally ribbed, box extrusions 93 of lightweight material are attached to the support beams 91 to provide an easily fabricated and lightweight platform 25 to support the carried car 35. A shaped cam plate 95 is attached to the inner side of each support beam 91. A pair of primary rollers 99 are attached to a primary roller shaft 101 that connects to the frame 17 by means of brackets 103 placed directly over one end of the axle leaf springs 21 thereby allowing a more direct transfer of loads to the rear wheels 19 of the service vehicle 13 when the car carrier 11 is in the transport position illustrated in FIGS. 5 and 1. In that position, the primary rollers 99 contact the cam plate 95 thus supporting a major portion of the platform 25 and payload. A mechanical advantage is gained for the initial platform 25 lift with said weight major portion resting on a more forward set of primary rollers 99 as shown, and which will then also allow a shallower cam plate 95 profile to be specified as the cam plate 95 responds to a double follower arrangement to specify the positioning path of the platform 25 as it is displaced, a first follower being said primary rollers 99 and a second follower being secondary rollers 109 which are discussed in greater detail below. A pair of secondary rollers 109 are attached to a secondary roller shaft 111 that connects to the rearmost portion of the service vehicle frame 17 by means of brackets 113. Attached to shaft 111 are the ends of two support feet lock cylinders 117 which are coupled at opposite ends to the support foot assemblies 29.

It should be noted that primary rollers 99, shaft 101, and brackets 103 could be eliminated so long as pin 79 is otherwise stabilized and cam plate 95 profile compensated. The secondary rollers 109 would then support the platform 25 in the transport position and the aforementioned advantages of including primary rollers 99 would not be gained.

As illustrated in FIG. 5, the support foot assembly 29 comprises a slide assembly 121 consisting of various section of standard rectangular tubing. Connected to this slide assembly 121 is a support foot return roller 123 and a coupler contact guide pad 125. The support foot return roller 123 contacts the bottom surface of the extrusions 93 attached to the main support beams 91 of the platform 25 thus retaining the support feet 29 as shown when the platform 25 is in the transport position illustrated in FIGS. 1 and 5. As the platform 25 is upwardly displaced, the support foot roller 123 follows the bottom surface of the extrusions 93 of the platform 25 until such contact is ceased which thus indicates the support foot 29 has gravitated to and contacted to support surface. Specifically, the slide assembly 121 fits in a rectangular tubing support foot housing 127. A spring 129 is positioned within this arrangement so that a first spring end contacts the guide pad 125. The spring 129 passes through the center portion of slide assembly 121 and contacts support foot through shaft 131 at a second spring end, Shaft 131 extends transversely through the support foot housings 127 and connects to the service vehicle frame 17 by means of brackets 128 as best seen in the view of FIG. 4. A pair of support foot pads 139 are provided, each one being pivotally coupled to the rectangular tubing support foot housings 127. The operation of the support foot assembly 29 can be explained by comparing FIGS. 5 and 6.

FIGS. 1 and 5 show the displaceable platform assembly 25 in the transport position. In order to displace the platform assembly 25, the double action hydraulic drive cylinder 51 is activated by hydraulic means well known in the art thereby causing the ram end 53 to begin exerting a pulling force on the rotatable cross bar 57. This pulling action on cross bar 57 causes the platform 25 simultaneously to tilt and slide by the pivoting action of the couplers 63 and 65 on upper shaft 67 about lower shaft 69. As the platform 25 tilts and slides rearward towards the load position, the support foot return roller 123 follows the bottom extrusion surface 93 of the platform 25 thereby allowing the support foot assemblies 29 to pivot about support foot shaft 131, this action being caused by the gravitational pull of the heavier pad end 139 of the support foot assembly 29. As the support foot assemblies 29 lower to meet their respective ground levels, each lock cylinder 117 draws in hydraulic fluid from a common hydraulic fluid resevoir noting however that each lock cylinder 117 and support foot assembly 29 is independent of the other in operation. At an intermediate position where the platform 25 would be located is the support feet 29 were to engage the ground their maximum allowable distance below that level of ground being experienced by the rear wheels 19, a lock cylinder fluid feed control valve (not shown) would be tripped closed. Immediately thereafter, cam plate 95 contacts the secondary roller 109 thereby transferring all loads to same. The extended and fluid filled lock cylinders 117 with feed valves shut are then able to transfer the major portion of said loads from the secondary rollers 109 through themselves and into the ground by way of the ground contacting support foot pads 139.

This intermediate platform position is illustrated in FIG. 2.

It should be noted that the hydraulic lock cylinders 117 could be fed by low-pressure fluid or assisted by a spring means to aid the gravitational pull of the support foot assemblies 29. Also, the lock cylinders 117 could be fed by high-pressure fluid such as that used by cylinder 51. The support feet 29 could then have their "stop" predetermined with versatility then limited, or the support feet 29 could be fitted with ground sensing limit switches to close fluid feed valves. The support feet return rollers 123 would then exert a force on the bottom surface of the extrusions 93 thereby assisting the main hydraulic drive cylinder 51 in the early stages of platform displacement. Raising the support feet 29 could remain by mechanical means and escape of the hydraulic fluid would be accomplished by various hydraulic means well known in the art.

Illustrated in FIGS. 3 and 6 is the car carrier 11 with platform 25 shown in the load position, ready for loading or unloading. The couplers 63 and 65 have contacted guide pads 125 and compressed the support foot slide assembly 121 which has served to dampen the gravity descent of the platform 25 as it approached the load position. This gravity loaded spring slide assembly 121 assists the main cylinder 51 to reposition the platform 25 to the transport position during the critical first stage of that displacement when cam plate 95 pressure angle is maximum in relation to the secondary roller 109. The spring 129 is fully compressed in the load position illustrated in FIGS. 3 and 6 and is exerting a force on the couplers 63 and 65. This force reduces the push that the hydraulic drive cylinder 51 must provide in order to displace the platform 25 initially from the load position. The gravity loaded spring slide assembly 121 therefore allows a smaller hydraulic drive cylinder 51, a smaller cross bar 57, smaller couplers 63 and 65, and smaller miscellaneous hardware to be used which allows a savings in both cost and weight.

In the load position illustrated in FIG. 6, the secondary rollers 109 are not contacting the cam plate 95, as rear platform support in load position is provided at the platform rear edge 24 by the ground that is has contacted, as shown in the view of FIG. 3. The gap shown between the cam plate 95 and the secondary roller 109 will allow the platform rear edge 24 to contact ground a limited distance below that ground contacted by the service vehicle rear wheels 19. Should said limited distance be exceeded, as would be characterized by the cam plate 95 contacting and being supported by the secondary roller 109, the operator in this unlikelihood would then reposition the car carrier 11 on more suitable ground. The platform rear edge 24 is, however, able to contact and be supported by any level of ground above that ground contacted by the service vehicle rear wheels 19.

Illustrated in FIG. 7 is a detail of the bumper assembly 31 which may be incorporated into the car carrier 11. The bumper assembly 31 includes a horizontal bumper component 135 which is a tube pivotally coupled to the service vehicle frame 17 by means of coupling member 141. Within bumper component 135 there is a second tube 137 capable of telescoping outwardly as the platform 25 is being displaced. Within telescoping tube 137 there is a return spring 138 which extends throughout the interior of tube 137 and which connects at a first end to the bumper end of said tube 137, and connects at a second end to coupling member 141. A nearly vertical bumper component 143 is pivotally coupled at an upper end to the platform 25 by means of brackets 145 and is pivotally coupled at a lower end to telescoping tube 137. A bumper 147 is rigidly attached to the lower end of bumper component 143. Vertical bumper component 143 includes a lock pawl 149 which will catch a raised portion 151 of horizontal bumper component 135 in the transport position illustrated in FIG. 7.

In operation, as the platform 25 moves rearward, vertical bumper component 143 will rotate in the direction of the arrow A and the telescoping tube 137 will be pulled outward in the direction of the other arrow. Then the platform 25 is in the load position as illustrated in FIG. 3, the bumper assembly 31 will be orientated in such a manner that vertical component 143, telescoping tube 137, and horizontal bumper component 135 will be substantially aligned and disposed a distance off the ground and sufficiently clear of the platform assembly 25. As the platform 25 is displaced from the load position illustrated in FIG. 3 to the transport position illustrated in FIG. 1, return spring 138 will cause telescoping tube 137 to retract within horizontal bumper component 135 until the bumper assembly 31 returns to the configuration illustrated in FIG. 7. The car carrier 11 can therefore be provided with a bumper which may be required by federal or state regulations governing highway vehicles.

It should be noted that bumper return spring 138 is loaded by both the gravity action of the platform as it approaches the load position, and by also the hydraulic drive cylinder 51 action that displaces the platform 25. As with the gravity loading absorbed by springs 129 of the support feet 29 slide assemblies 121, this partial gravity loading action absorbed by bumper return spring 138 will also assist the main hydraulic drive cylinder 51 reposition the platform 25 to the transport position during the critical first stage of that displacement.

Tow bar 33 is of a conventional construction and is coupled to or removed from the platform rear edge 24 by manual means.

Other items such as platform hold down means, hydraulic apparatus means, etc., are all well known in the art and thus not identified or remarked.

It will thus be seen that the objects made apparent from the preceding description are efficiently attained, and since certain changes may be made in construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Now that the invention has been described,

What is claimed is:

1. In a car carrier service vehicle having a standard frame, a car carrying mechanism comprising:
    a displaceable platform adapted to be disposed at a transport position, a load position, and a plurality of positions intermediate therefrom;
    means coupled to the front of the displaceable platform and to the service vehicle frame for pivoting and sliding the displaceable platform; and
    a support foot pivotally coupled to the service vehicle frame and removably engageable to the displaceable platform for supporting a major portion of any load on the displaceable platform when the displaceable platform is in a predetermined intermediate interval between the transport position and the load position wherein said support foot engages the means for pivoting and sliding as the displaceable platform approaches and is disposed at the load position and disengages said means for pivoting and sliding when the platform approaches the transport position.

2. In the car carrier vehicle of claim 1 said means for pivoting and sliding the displaceable platform comprising:
   at least one coupler pivotally coupled at one end to the displaceable platform and at the other end to the vehicle frame;
   means pivotally coupled to the coupler for exerting force on said coupler; and
   means for specifying the sliding motion path and vertically displacing the displaceable platform as it slides.

3. In the improved car carrier vehicle of claim 2 said means for exerting force comprising:
   at least one hydraulic cylinder having a body end and a ram end, said ram end pivotally coupled to the coupler;
   a pin;
   means for pivotally coupling the body end of the hydraulic cylinder to the pin; and
   means connected to the frame for supporting said pin.

4. In the car carrier of claim 2 said means for specifying the sliding motion path and vertically displacing comprising:
   a shaped cam plate attached to the displaceable platform; and
   a roller assembly connected to the frame and adapted to engage the shaped cam plate.

5. In the car carrier of claim 4, said roller assembly comprising a primary roller connected to the frame and adapted to engage the shaped cam plate in the transport position, and a secondary roller connected to the frame and adapted to engage the shaped cam plate in the intermediate interval between the transport position and the load position.

6. The car carrier of claim 1 wherein said support foot comprises:
   at least one support foot housing pivotally coupled to frame;
   at least one support foot pad pivotally coupled to the bottom of the support foot housing;
   a roller assembly connected to the frame;
   a lock means coupled at one end to the roller assembly and at the other end to the support foot housing;
   means coupled to the support foot housing for lowering the support foot housing as the displaceable platform assembly approaches the predetermined intermediate interval; and
   means coupled to the support foot housing for raising the support foot housing as the displaceable platform assembly approaches the transport position.

7. The car carrier of claim 6 wherein said support foot further comprises a slide assembly movably mounted on said support foot housing opposite said support foot pad, the distal end of said slide assembly comprising a pad means engageable with said means for pivoting and sliding the displaceable platform and engageable to the platform to assist in the displacement thereof and to raise said support foot as the platform is lowered into the transport position; said slide assembly further comprising a slide spring operatively disposed between said pad and the service vehicle frame, whereby said pad means is normally urged away from said support foot pad thereby allowing said slide spring to compress and dampen the descent of said displaceable platform and to assist said means for pivoting and sliding said displaceable platform when said means is actuated to move said displaceable platform from the load position to the transport position.

8. The car carrier of claim 1 wherein said displaceable platform assembly comprises two main support beams disposed substantially parallel to the frame of the service vehicle when the displaceable platform assembly is in the transport position, said beams having an upward projecting end portion thereby giving the displaceable platform assembly an angled configuration to define at least two surface planes upon which the car may rest; and a plurality of interlocking floor extrusions rigidly attached to said beams.

9. An improved car carrier of the type including a service vehicle having front and rear wheels, a frame, axle spring, and a displaceable platform assembly wherein the improvement comprises:
   means for displacing said displaceable platform;
   means defining a transport position, an intermediate position, and a load position for said platform;
   means for carrying substantially all loads on the platform through the axle springs when said platform is in a position between the transport and the intermediate position;
   a support foot assembly pivotally mounted on said frame and engageable to said displaceable platform comprising at least one support foot housing pivotally coupled to the frame; at least one support foot pad pivotally coupled to the bottom of the support foot housing; a roller assembly connected to the frame; a lock means coupled at one end to the roller assembly and at the other end to the support foot housing; means coupled to the support foot housing for lowering the support foot housing as the displaceable platform assembly approaches the intermediate position; and means coupled to the support foot housing for raising the support foot housing as the displaceable platform assembly approaches the transport position, and a slide assembly movably mounted on said support foot housing opposite said support foot pad, the distal end of said slide assembly comprising a pad means engageable with said means for pivoting and sliding the displaceable platform and engageable to the platform to assist in the displacement thereof and to raise said support foot housing as the platform is lowered into the transport position; said slide assembly further comprising a slide spring operatively disposed between said pad and the service vehicle frame, whereby said pad means is normally urged away from said support foot pad thereby allowing said slide spring to compress and dampen the descent of said displaceable platform and to assist said means for pivoting and sliding said displaceable platform when said means is actuated to move said displaceable platform from the load position to the transport position;
   means for carrying the major portion of all loads on the displaceable platform through the support foot assembly when the displaceable platform is in a position between said intermediate position and said load position; and means for carrying the major portion of the loads on the displaceable platform through the rear edge of the displaceable platform when said displaceable platform is at said load position.

10. The improved car carrier of claim 9 further comprising a bumper assembly pivotally connected to the frame.

11. The improved car carrier of claim 10 wherein said bumper assembly comprises a horizontal bumper component pivotally connected at one end of the frame and a transverse bumper pivotally connected to the other end of said component; said bumper assembly further comprising a substantially vertical component disposed in pivotable interconnecting relation between said transverse bumper and the displaceable platform, whereby movement of the platform will cause movement of the bumper assembly in relation thereto.

12. The improved car carrier of claim 11 wherein said horizontal bumper component further comprises spring means operatively disposed between said one end and said transverse bumper, whereby said bumper assembly is normally urged toward the transport position.

* * * * *

UNITED STATES PATENT AND TRADEMARK OFFICE
CERTIFICATE OF CORRECTION

PATENT NO. : 4,456,420
DATED : June 26, 1984
INVENTOR(S) : Robert H. Newhard

It is certified that error appears in the above-identified patent and that said Letters Patent are hereby corrected as shown below:

Column 12, line 24, delete "spring" and insert --springs--.

Column 13, line 12, delete "of" and insert --to--.

Signed and Sealed this

Twenty-third Day of October 1984

[SEAL]

Attest:

Attesting Officer

GERALD J. MOSSINGHOFF

Commissioner of Patents and Trademarks